Dec. 3, 1968  MITSUJI IWANAGA ET AL  3,414,248
APPARATUS FOR PURIFYING CONTAMINATED GASES
Filed June 22, 1965  3 Sheets-Sheet 1
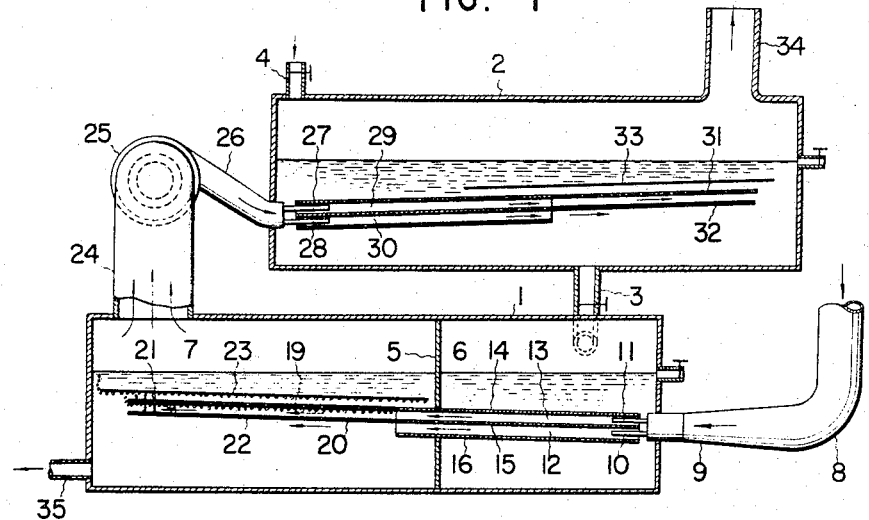
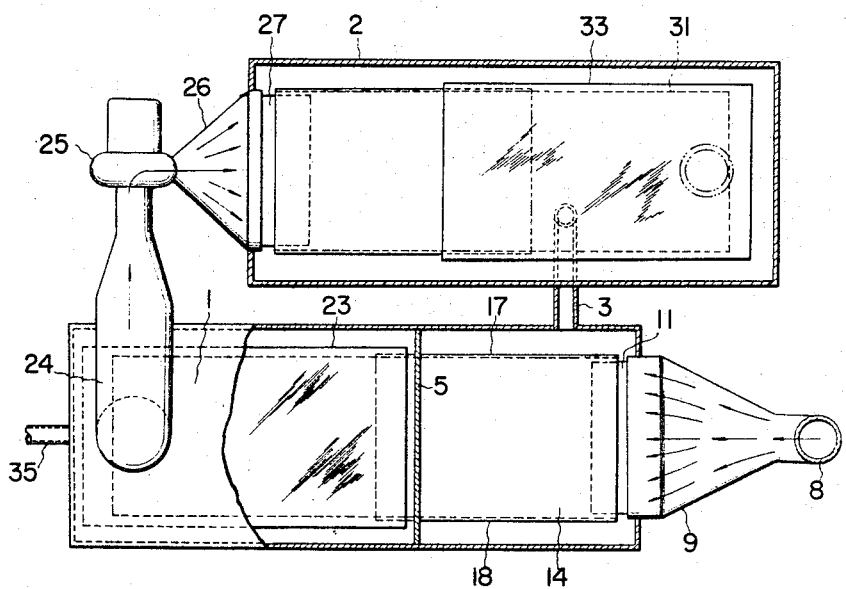
INVENTORS
MITSUJI IWANAGA
HIROSHI IDEMITSU
BY
H. Edward Mestern

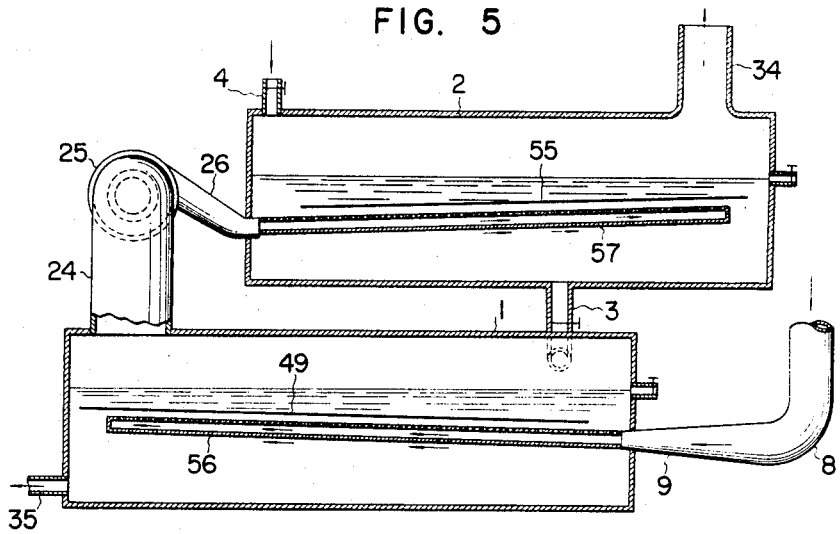
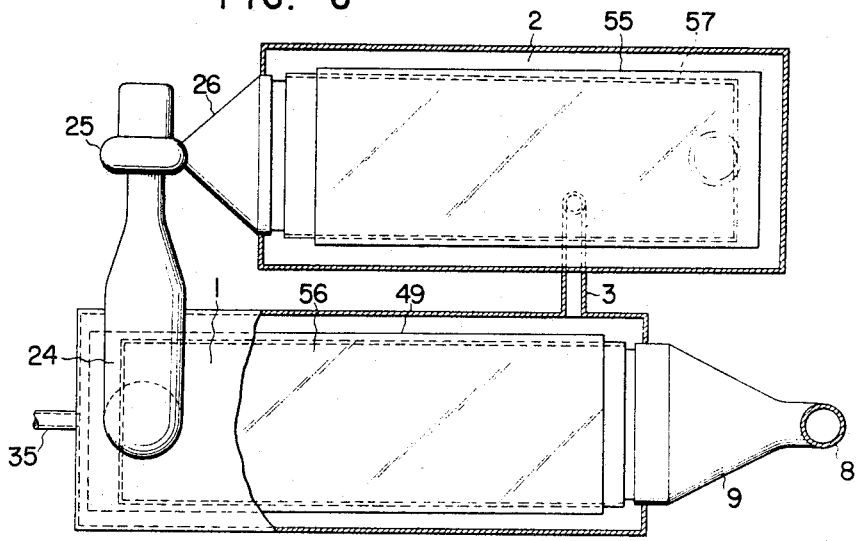

United States Patent Office 3,414,248
Patented Dec. 3, 1968

3,414,248
APPARATUS FOR PURIFYING
CONTAMINATED GASES
Mitsuji Iwanaga, 2177 Suwano-machi, Kurume-shi,
Fukuoka-ken, Japan, and Hiroshi Idemitsu, 275
4-chome, Fukuoka-shi, Fukuoka-ken, Japan
Filed June 22, 1965, Ser. No. 465,944
Claims priority, application Japan, June 27, 1964,
39/36,635; Mar. 3, 1965, 40/16,275
1 Claim. (Cl. 261—122)

ABSTRACT OF THE DISCLOSURE

A device for the purification of contaminated gases having at least one closed tank which contains a relatively shallow purifying liquid bath and means for the introduction of said gas which have a flattened configuration disposed in the tank, further a flat perforated plate with a large number of small holes connected to the introducing means. A blower is connected to the bath, and a baffle plate is disposed above the plate leaving a small space therebetween. The width and length of the baffle plate is larger than the perforated plate so that the former covers the latter from above. The baffle plate also is below the upper bath level and is slightly inclined from horizontal so as to guide the stream of gas bubbles emanating from the perforated plate in an upward direction.

---

This invention relates to purification of contaminated gases, particularly to such purification by means of purifying liquids. More specifically, the invention concerns a new apparatus of simple construction for purifying contaminated gases wherein a gas to be purified is injected as numerous fine bubbles into a relatively shallow bath of a purifying liquid thereby to accomplish purification of the contaminated gas through intimate contact between the gas and liquid.

Heretofore, apparatuses of the instant type have operated to introduce contaminated gas by means such as blowers into purifying liquids thereby to purify said gases, but since in each case the point of introduction of the gas has been in a deep part of the liquid, it has been necessary for the gas introducing means such as a blower to be of high power. If the introducing means were of low power, ample purification could not be attained.

It is an object of the present invention to provide an apparatus of relatively simple construction for purifying contaminated gases capable of accomplishing ample purification with a blower of relatively low power.

According to the present invention, briefly stated, there is provided an apparatus for purifying contaminated gases comprising at least one closed purification tank containing a relatively shallow bath of a purifying liquid, a gas introducing means of horizontally flattened configuration disposed within the bath in the tank at its gas inlet end, a perforated plate structure of horizontally flattened configuration having a large number of small holes, said structure being connected to the gas introducing means and disposed within the liquid thereby to cause intimate contact between gas introduced through the gas introducing means and to cause the gas to rise in the form of minute bubbles through the small holes and through the liquid, at least one baffle plate disposed within the bath and above the perforated structure thereby to lengthen the contact time between the gas and liquid, and a gas blower for causing contaminated gas to be purified to be introduced into the bath through the gas introducing means.

The nature, principle, and details of the invention will be more clearly apparent from the following detailed description with respect to preferred embodiments of the invention when taken in conjunction with the accompanying drawings in which like parts are designated by like reference characters, and in which:

FIG. 1 is a side elevational view in vertical section showing one embodiment of the purification apparatus according to the invention;

FIG. 2 is a plan view, with parts cut away, of the apparatus shown in FIG. 1;

Figure 3:
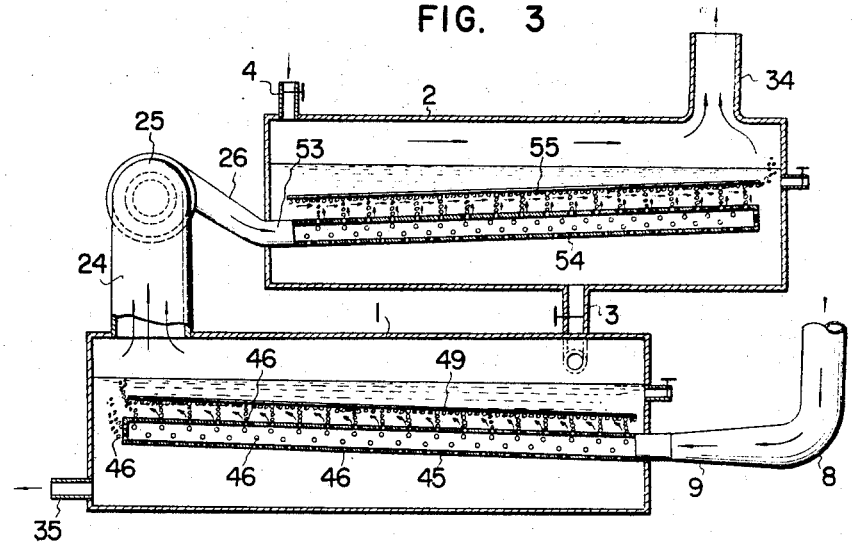
Figure 4:
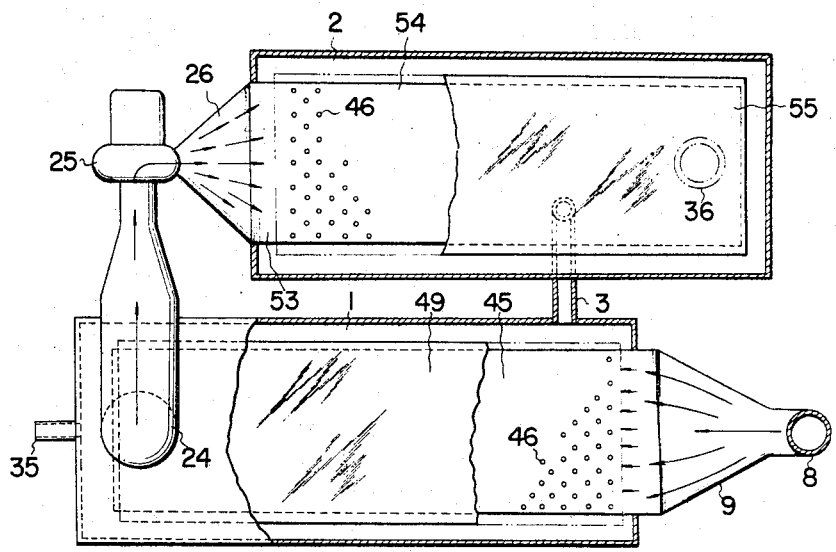

FIGS. 3 and 4 are respectively side elevational and plan views, similar to FIGS. 1 and 2, showing another embodiment of the invention; and FIGS. 5 and 6 are respectively side elevational and plan views, similar to FIGS. 1 and 2, showing a further embodiment of the invention in which indication of gas bubbles is omitted.

In one embodiment of the invention as shown in FIGS. 1 and 2, the apparatus is provided with a first purification tank 1 and a second purifiction tank 2 positioned above the first tank 1, the two purification tanks being closed and connected by an interconnecting pipe 3. The second tank 2 is provided at the top of its one end with a purifying liquid supply pipe 4, through which purifying liquids such as water and ammonia solution are supplied so as to occupy, partially, the tanks 1 and 2.

The interior of the first purification tank 1 is divided by a transverse dividing wall 5 into chambers 6 and 7. The first purification tank 1 is provided at its end on the side of the chamber 6 with an inlet duct 8 for introducing gases to be purified, the inlet duct 8 having a horizontally flattened, flared entrance end 9 as shown in FIG. 2. This entrance end 9 is further provided with flattened nozzles 10 and 11, which open into similarly flattened gas passages 12 and 13 for introducing the gases to be purified. These gas passages are formed by an upper plate 14, an intermediate plate 15, and a lower plate 16 functioning to separate the two passages from each other and side plates 17 and 18 covering the sides of the passages.

The downstream ends of these gas passages, that is, the ends opposite the entrance nozzle ends are passed through the dividing wall 5 and open into the chamber 7, where the upper plate 14 and the intermediate plate 15 are provided respectively with extensions in the form of perforated plates 19 and 20 connected thereto and provided with a large number of perforations 21 and 22. The gas passages and perforated plates are disposed with a slight inclination within the bath of purification liquid, whereby the entrance nozzle end of these passages is lower than the downstream end of the perforated plates. A baffle plate 23 is positioned above the perforated plate 19 with a very small space therebetween.

The upper part of the end of the chamber 7 away from the dividing wall 5 communicates with the lower end of a riser duct 24 connected at its upper end to the suction side of a blower 25. The discharge side of the blower 25 is connected to one end of the second purification tank 2 through a discharge duct 26 with a flattened end similar to the entrance end 9 of the aforementioned inlet duct 8. The flattened end of the duct 26 is similarly provided with nozzles 27 and 28 opening into gas entrance passages 29 and 30 within the second tank 2, which passages have upper and intermediate plates connected to extensions in the form of perforated plates 31 and 32. A baffle plate 33 is positioned slightly above the upper perforated plate 31.

Since the entire assembly consisting of the gas passages 29 and 30, the perforated plates 31 and 32, and the baffle plate 33 is similar in construction and positioning to that within the first purification tank 1, detailed description thereof will be herein omitted.

The end of the second tank 2 opposite the gas entrance end is provided at its upper part with a purified gas discharge duct 34. The end of the first tank 1 opposite the gas entrance end is provided at its lower part with a purifying liquid discharge pipe 35.

The purification apparatus of the above described construction according to the invention operates in the following manner. When the blower is operated, the gas to be purified is drawn in through the inlet duct 8 and its flattened entrance part 9 and through nozzles 10 and 11 into the gas passages 12 and 13. Accordingly, the gas advances through these gas passages in the arrow direction together with the purifying liquid, whereby the contaminants such as $SO_2$ contained within the gas are absorbed.

The gas and purifying liquid further advance into the passage between the perforated plates 19 and 20 and the region below the perforated plate 20. The gas then passes through the numerous perforations of the plates in the form of small bubbles, which rise through the purifying liquid.

After reaching the baffle plate 23, the rising small gas bubbles change their direction and flow horizontally along the position just beneath the baffle plate 23 for a long period of time.

Furthermore, since there are extremely many small gas bubbles, the total sum of the surface areas of the gas bubbles, that is, the contact area between the gas and the liquid is very large. Consequently, an intimate and thorough contact between the gas and liquid is secured. As a result, the contaminants such as $SO_2$, soot, and smoke within the gas are absorbed to a substantial extent.

The gas which has been purified in the above described manner is further sent by the blower 25 through ducts 24 and 26 into the second purification tank 2, where, after it has passed through the gas passages and perforated plates and past the baffle plate, it is almost totally purified and is discharged to any desired place through the discharge duct 34.

Since the purification process within the second purification tank 2 is exactly the same as that within the first purification tank 1 during the above described operation, detailed description thereof will herein be omitted.

In another embodiment of the invention as shown in FIGS 3 and 4, the purification apparatus includes first and second purification tanks 1 and 2 similar to those in the example shown in FIGS. 1 and 2 except that there is no dividing wall. In the first purification tank 1, there is disposed in the bath liquid a perforated purification duct 45 of horizontally flattened shape for causing contaminated gas introduced thereinto to be brought into intimate contact with the purifying liquid.

This purificaion duct 45, which extends from the inlet end of the first bath 1 almost completely to the opposite end thereof and covers almost the entire width of the bath 1, is provided over all of its walls with numerous perforations 46. This duct 45 is slightly inclined so as to rise from its inlet end toward the opposite end. The flattened flared end 9 of an inlet duct 8 for introducing contaminated gas to be purified is contiguously connected to the inlet end of the purification duct 45. A baffle plate 49 is disposed above and substantially parallel to the duct 45.

The second purification tank 2 is also provided with a perforated purification duct 54 and a baffle plate 55 similar in construction and disposition to the duct 45 and baffle plate 49 in the first tank 1.

The other parts interconnecting the first and second purification tanks 1 and 2 are similar to those described above in conjunction with FIGS. 1 and 2.

The operation of the above described apparatus is similar to that of the apparatus shown in FIGS. 1 and 2, the gas to be purified being caused by the purification ducts 45 and 54 to be brought into intimate contact with the purifying liquid and then by the perforations 46 to rise in the form of fine bubbles through the liquid.

In one modification (not shown) of the above described apparatus, the bottoms of the purification ducts 45 and 54 are left open. In this case, it is preferable to dispose each purification duct relatively close to the bottom of its purification tank.

In a further modification as shown in FIGS. 5 and 6 of the embodiment of the invention described above with reference to FIGS. 3 and 4, the first and second purification tanks 1 and 2 are provided with purification ducts 56 and 57 and baffle plates 49 and 55 generally similar to those in the apparatus shown in FIGS. 3 and 4. Each of the purification ducts 56 and 57, however, is provided with perforations in only the upper wall thereof, the end wall, side walls, and bottom walls being fully closed.

In the design of the purification apparatus according to the invention, it is preferable that the perforated plates or perforated ducts used therein be disposed horizontally or with a slight angle of inclination producing a rise in the flow direction, in relatively shallow baths of purifying liquid (since with shallow baths, less power of the blower is required).

It will be apparent to those skilled in the art that the baffle plate disposed above the perforated plates or duct is highly effective in lengthening the flow path of the gas bubbles through the purifying liquid, thereby lengthening the contact time between the gas and the liquid. As is known, contact between a gas and a liquid for purposes such as purification can be improved by increasing the product of the total contact area and the contact time.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What we claim is:

1. In an apparatus for purifying contaminated gases comprising at least one closed purification tank containing a relatively shallow bath of a purifying liquid, a gas introducing means of flattened configuration disposed within said bath in said tank at the gas inlet end thereof, a perforated plate structure of flattened configuration having a large number of small holes at its upper surface, said structure being connected to said gas introducing means and disposed within said liquid, and a gas blower for causing contaminated gas to be purified to be introduced into said bath through said gas introducing means, an improvement according to which a baffle plate is positioned above the said perforated plate structure with a small space therebetween, the length and width of said baffle plate being larger than those of said perforated plate structure to cover sufficiently said perforated plate structure from above and said baffle plate being positioned below the upper level of the bath so as to be slightly inclined with respect to horizontal position, thereby to guide, from the lower portion toward the higher portion of said baffle plate, the flow of gas bubbles discharged from said perforated plate structure.

References Cited

UNITED STATES PATENTS

| | | | |
|---|---|---|---|
| 42,469 | 4/1864 | Griffin | 261—123 |
| 829,375 | 8/1906 | Garvey | 261—124 |
| 1,014,893 | 1/1912 | Moeller | 261—124 XR |
| 3,063,686 | 11/1962 | Irvin | 261—123 XR |
| 3,231,252 | 1/1966 | Reed | 261—123 |

FOREIGN PATENTS 1,227,847   8/1960   France.

HARRY B. THORNTON, *Primary Examiner.*

T. R. MILES, *Assistant Examiner.*